United States Patent [19]

Cooper et al.

[11] 3,925,509

[45] Dec. 9, 1975

[54] LIGHT STABILIZED POLYPHENYLENE ETHER RESIN COMPOSITION

[75] Inventors: Glen D. Cooper; Visvaldis Abolins, both of Delmar, N.Y.

[73] Assignee: General Electric Company, Pittsfield, Mass.

[22] Filed: Dec. 26, 1973

[21] Appl. No.: 428,448

[52] U.S. Cl.. 260/876 R; 260/45.75 N; 260/45.8 N; 260/45.95; 260/42.18; 260/887
[51] Int. Cl.$^2$.................. C08L 51/00; C08L 53/00
[58] Field of Search... 260/876 R, 901, 887, 45.8 N, 260/45.75 N

[56] References Cited
UNITED STATES PATENTS

| | | | |
|---|---|---|---|
| 3,004,896 | 10/1961 | Heller | 167/90 |
| 3,310,575 | 3/1967 | Spivack | 260/429 |
| 3,383,435 | 5/1968 | Cizek | 260/887 |
| 3,663,661 | 5/1972 | Katchman | 260/901 |
| 3,761,541 | 9/1973 | Katchman | 260/876 R |
| 3,787,532 | 1/1974 | Carmelite | 260/876 R |
| 3,792,122 | 2/1974 | Fromuth | 260/876 R |

OTHER PUBLICATIONS

Encyclopedia of Polymer Science Vol. 14, pp. 125–148.

*Primary Examiner*—Richard B. Turer
*Attorney, Agent, or Firm*—William F. Muffati; Edward A. Hedman; James V. Costigan

[57] ABSTRACT

Ultraviolet light stable polyphenylene ether compositions are provided by this invention. These compositions include as the stabilizer system, a minor amount of a combination of an ultraviolet light absorber selected from the group consisting of hydroxybenzotriazoles, hydroxybenzophenones and substituted derivatives thereof with an organic nickel compound.

8 Claims, No Drawings

LIGHT STABILIZED POLYPHENYLENE ETHER RESIN COMPOSITION

This invention provides ultraviolet light stabilized polyphenylene ether compositions that include, in combination, a minor amount of an ultraviolet light absorber selected from the group consisting of hydroxybenzotriazoles, hydroxybenzophenones and substituted derivatives thereof with an organic nickel compound.

BACKGROUND OF THE INVENTION

The term "polyphenylene ether resin" includes a family of polymers well known to those skilled in the art, they are made by a variety of catalytic and non-catalytic processes from the corresponding phenols or reactive derivatives thereof. By way of illustration, certain of the following polyphenylene ethers are discussed in Hay, U.S. Pat. Nos. 3,306,874 and 3,306,875, and in Stamatoff, U.S. Pat. Nos. 3,257,357 and 3,257,358. Also, the Bennett and Cooper patents, U.S. Pat. Nos. 3,639,656, 3,642,699 and 3,661,848 describe processes for the preparation of polyphenylene ethers. In the Hay patents, the polyphenylene ethers are prepared by a oxidative coupling reaction comprising passing an oxygen-containing gas through a reaction solution of a phenol and a metal-amine complex catalyst. Other disclosures relating to processes using metal-amine catalysts are found in Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,400,217; and disclosures relating to metal based catalysts which do not include amines, are well known from patents such as Wieden et al, U.S. Pat. No. 3,442,885 (copper-amidines); Nakashio et al, U.S. Pat. No. 3,573,257 (metal-alcoholate or phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. All of the patents which are mentioned above are incorporated herein by reference.

The Cizek patent, U.S. Pat. No. 3,383,435 discloses blends of polyphenylene ether resins and styrene resins. The thermoplastic blends disclosed by Cizek may include a rubber-modified styrene resin, as well as crystal polystyrene. This patent is also incorporated by reference.

It has been observed that blends of polyphenylene ether resins with styrene resins exhibit a discoloration when exposed to ultraviolet radiation. The discoloration is usually in the form of a yellowish tint that is encountered even upon exposure to ordinary fluorescent lights or to sunlight. Higher concentrations of polyphenylene ether in a particular composition will result in a more rapid yellowing of the test sample.

It has been discovered that the use, in combination, of a stabilizer which comprises a hydroxybenzophenone or a hydroxybenzotriazole with an organic nickel compound provides a stabilized polyphenylene ether-styrene resin composition.

Certain stabilizer compositions within the scope of the invention show a higher degree of stabilization than would be expected from the behaviour of either component alone.

Description of the Invention

According to the present invention, there is provided a composition which is stabilized to degradation by ultraviolet light. The stabilized composition comprises a major amount of a thermoplastic resin mixture, which comprises a normally unstable polyphenylene ether component and a rubber-modified, high-impact styrene resin that is stabilized with a minor amount of a stabilizer which comprises, in combination, a first component which is an ultraviolet light absorber selected from the group consisting of hydroxybenzotriazoles, hydroxybenzophenones and substituted derivatives thereof and a second component which is an organic nickel complex.

The polyphenylene ether resin component is selected from compounds having the formula:

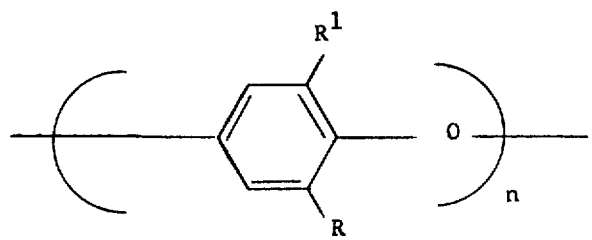

wherein $R$ and $R^1$ are monovalent substituents selected from the group consisting of hydrogen, halogen, hydrocarbon radicals, halohydrocarbon radicals having at least two carbon atoms between the halogen atom and the phenyl nucleus, said radicals being free of a tertiary alpha-carbon atom, and $n$ is a whole integer of at least 50.

The preferred polyphenylene ether resin is poly-(2,6-dimethyl-1,4-phenylene) ether.

Rubber-modified, high-impact styrene resins which are useful in the present invention include those styrene resins having at least 25% of the polymer units which are derived from monomers having the formula:

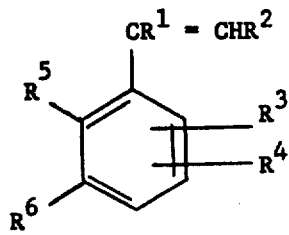

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

The hydroxybenzotriazole compounds which may be employed are selected from the formula:

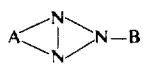

wherein A represents an o-phenylene radical bound by two neighboring carbon atoms to two nitrogen atoms of the triazole ring, and B represents a phenyl radical which contains in the 2-position an OH group and in further positions a member selected from the group consisting of H, lower alkyl, lower alkoxy, lower carbalkoxy, cyclohexyl, phenyl and halogen.

Examples of compounds of this type include 2-(2 H-benzotriazol-2-yl)-p-cresol; 2-tert-butyl-6-(5-chloro-2H-benzotriazol-2-yl)-p-cresol; 2,4-di-tert-butyl-6-(5-chloro-2H-benzotriazol-2-yl) phenol and 2-(2 H-benzotriazol-2-yl)-4,6-di-tert-pentylphenol. Also other compounds of this type may be found in U.S. Pat. No. 3,004,896 which is hereby incorporated by reference.

The hydroxybenzophenophenone compounds which may be employed are selected from compounds of the formula:

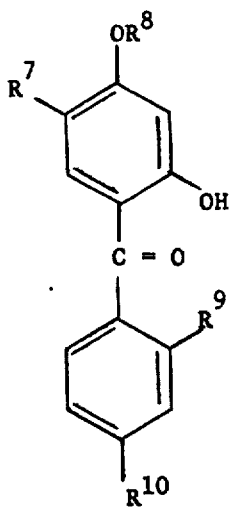

wherein $R^7$ is hydrogen or sulfo; $R^8$ is hydrogen or an alkyl group of from 1-18 carbon atoms; $R^9$ is hydrogen or hydroxy and $R^{10}$ is hydrogen, hydroxy or an alkoxy group having from 1 to 18 carbon atoms. Examples of compounds within the scope of this generic formula include 2,4-dihydroxybenzophenone; 2-hydroxy-4-methoxybenzophenone; 2-hydroxy-4-octoxybenzophenone; 2-hydroxy-4-heptyloxybenzophenone; 2-hydroxy-4-dodecyloxybenzophenone; 2-hydroxy-4-methoxybenzophenone-5-sulfonic acid; 2,2',4,4'-tetrahydroxybenzophenone; 2,2'-dihydroxy-4,4'-dimethoxybenzophenone and 4-butoxy-2,2'-dihydroxybenzophenone. Other examples of these compounds are also described in the literature and may be selected by those skilled in this art. For example, the Encyclopedia of Polymer Science, Vol. 14, pp. 127-140, which is hereby incorporated by reference disclose other compounds of this type.

The particular organic nickel complex is not critical to the practice of the invention. The preferred complexes are those compounds having the formula:

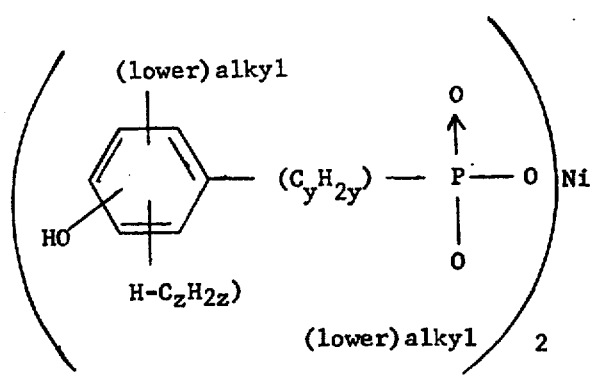

Examples of useful nickel complexes include nickel bis(O-butyl (3,5-di-tert-butyl-4-hydroxybenzyl) ) phosphonate and nickel bis(O-ethyl (3,5-di-tert-butyl-4-hydroxybenzyl) ) phosphonate. These compounds are described in U.S. Pat. No. 3,310,575 which is hereby incorporated by reference.

The compositions according to this invention will contain from about 20–80 parts by weight of polyphenylene ether resin component; from 80–20 parts by weight of the rubber-modified, high-impact styrene resin component and from 0.5–5 parts by weight of the stabilizer combination. The preferred blends will usually contain less than 50% of polyphenylene ether by weight, for example, 35 parts by weight of polyphenylene ether resin and 65 parts by weight of high-impact rubber-modified polystyrene.

The stabilizer combination will consist of a first and second component which will be present at a weight ratio of from 0.25:1 to 4:1.

The compositions of the invention may also include reinforcing fillers, such as aluminum, iron or nickel, and the like, and non-metals, such as carbon filaments, silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes,e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ inches to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inches and 0.125 inches (⅛ inches).

It is a preferred feature of this invention also to provide flame retardant thermoplastic compositions, as defined above by modifying the composition to include a flame-retardant additive in a minor proportion but in an amount at least sufficient to render the composition non-burning or self-extinguishing.

Particular flame retardants which may be used are well known and are described in the literature.

The compositions may be prepared by tumbling the components, extruding the mixed powders into a continuous strand, chopping the strands into pellets and thereafter molding the pellets into the desired shape. These techniques are well known to those skilled in this art and are not a critical feature of the invention.

The preferred compositions of the invention include those which comprise 2-(2H-benzotriazol-2-yl)-p-cresol; 2-hydroxy-4-octoxybenzophenone and 2-(2H-benzotriazol-2-yl)-4,6-di-tert-pentyl phenol, in addition to rubber-modified, high-impact styrene.

Description of the Preferred Embodiments

The present invention is further illustrated in the following examples which are set forth as further descriptions of the invention, but are not to be construed as limiting the invention thereto.

EXAMPLE 1

A blend of 35 parts by weight of polyphenylene ether resin having an intrinsic viscosity of 0.45–0.65 dl/g., measured in chloroform at 30°C., 65 parts by weight of high impact, rubber-modified polystyrene*, 7 parts by weight of triphenylphosphate, 0.5 parts by weight of tridecylphosphite, 8 parts by weight of light gray pigment ($TiO_2$ + carbon black) is prepared. The blends were extruded in a 28 mm twin screw extruder and molded into 2 inches × 2 inches plates on a Newbury injection molding machine.

*Foster Grant 834 polystyrene.

Stabilized test samples are prepared with the following additives:

ADDITIVES

|   | Hydroxybenzotriazole 1.0 parts by weight | Nickel Complex 0.5 parts by weight |
|---|---|---|
| A | 2-(2H-benzotriazol-2-yl) -p-cresol | — |
| B | — | nickel bis(O-butyl (3,5-di-tert-butyl-4-hydroxybenzyl)) phosphonate |
| C | 2-(2H-benzotriazol-2-yl) -p-cresol | " |
| D | " | nickel bis(O-ethyl (3,5-di-tert-butyl -4-hydroxybenzyl)) phosphonate |

|   | Hydroxybenzophenone 0.5 parts by weight | Nickel Complex 0.5 parts by weight |
|---|---|---|
| E | 2-hydroxy-4-(octyloxy) benzophenone | nickel bis(O-ethyl 3,5-di-tert-butyl-4-hydroxybenzyl)) phosphonate |

|   | Hydroxybenzotriazole 0.5 parts by weight | Nickel Complex 0.5 parts by weight |
|---|---|---|
| F | 2-(2H-benzotriazol-2-yl) -4,6-di-tert-pentylphenol | nickel bis(O-ethyl (3,5-di-tert-butyl-H-hydroxybenzyl)) phosphonate |
| G | 2-(2H-benzotriazol-2-yl) -p-cresol | " |
| H | " | — |
|   | 0.3 parts by weight | 0.3 parts by weight |
| I | 2-(2-H-benzotriazol-2-yl)- p-cresol | nickel bis(O-ethyl (3,5-di-tert-butyl-4-hydroxybenzyl)) phosphonate |
| J | control (no stabilizer) | |

Test samples were placed in racks on a rotating platform protected by 0.130 inches of ordinary window glass. Illumination was provided by a battery of fluorescent blacklight lamps at a distance of 3 inches. The times required for an increase of one yellowness unit as determined by ASTM Test No. D 1925 are listed in Table I.

TABLE I

| SAMPLE | DAYS FOR ONE UNIT YELLOWNESS INCREASE |
|---|---|
| A | 3 |

TABLE I-continued

| SAMPLE | DAYS FOR ONE UNIT YELLOWNESS INCREASE |
|---|---|
| B | 7.5 |
| C | 10 |
| D | 12 |
| E | 10 |
| F | 10 |
| G | 10 |
| H | 4 |
| I | 6 |
| J | 5 |

Samples A, B and C were also evaluated under daylight fluorescent light by exposure of the Sample 3 inches from a daylight fluorescent bulb. The results are reported in Table II.

TABLE II

| SAMPLE | DAYS FOR ONE UNIT YELLOWNESS INCREASE |
|---|---|
| A | 10 |
| B | 14 |
| C | 19 |
| J | 10 |

From a review of this data, it can be seen that the effect of the combined stabilizers is more than an additive effect, as the two component stabilizer system provides an unexpectedly high degree of stabilization in a polyphenylene ether composition.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A stabilized composition comprising a major amount of a thermoplastic resin having from 20–80 parts by weight of a normally unstable polyphenylene ether component, from 20–80 parts by weight of a rubber modified, high-impact styrene resin and from 0.5–5 parts by weight of a stabilizer which comprises in combination, a first component which is an ultra-violet light absorber selected from the group consisting of hydroxybenzotriazoles of the formula:

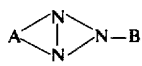

wherein A represents an o-phenylene radical bound by two neighboring carbon atoms to two nitrogen atoms of the triazole ring, and B represents a phenyl radical which contains in the 2-position an OH group and in further positions a member selected from the group consisting of H, lower alkyl, lower alkoxy, lower carbalkoxy, cyclohexyl, phenyl and halogen and a second component which is an organic nickel complex, the weight ratio of the first component to the second component being from 0.25:1 to 4:1.

2. A composition according to claim 1 wherein the polyphenylene ether resin component is of the formula:

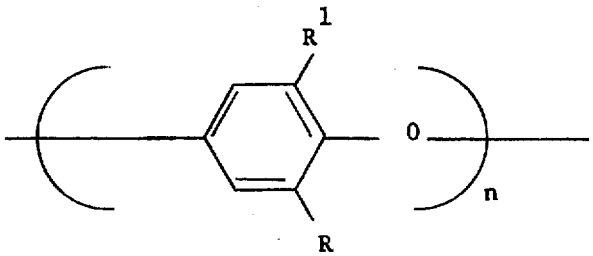

wherein R and $R^1$ are monovalent substituents selected from the group consisting of hydrogen, halogen, hydrocarbon radicals, halohydrocarbon radicals having at least two carbon atoms between the halogen atom and the phenyl nucleus, said radicals being free of a tertiary alpha-carbon atom, and $n$ is a whole integer of at least 50.

3. A composition according to claim 1 wherein the rubber modified, high-impact styrene resin has at least 25% of its units derived from a monomer having the formula:

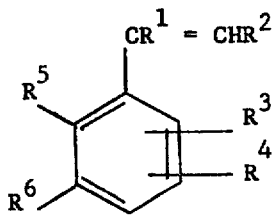

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

4. A composition according to claim 1 wherein the organic nickel complex is selected from compounds of the formula

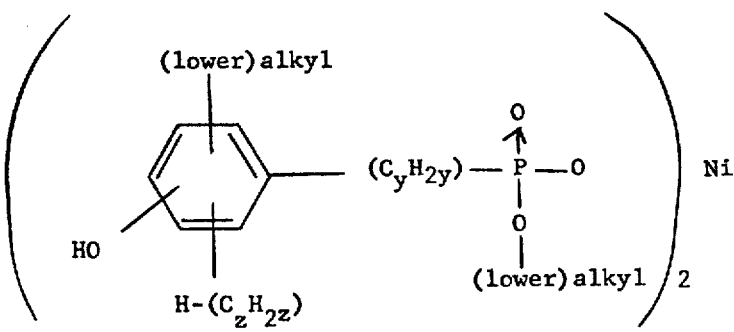

where $z$ has a value of from 0 to 6 and $y$ has a value of from 1 to 4.

5. A composition according to claim 1 wherein the polyphenylene ether is poly-(2,6-dimethyl-1,4-phenylene) ether.

6. A composition according to claim 1 wherein said stabilized composition contains from about 35 to 65 parts by weight of the polyphenylene ether resin component and from 0.5 to 5 parts by weight of the stabilizer combination.

7. A composition according to claim 1 wherein said polyphenylene ether is poly-(2,6-dimethyl-1,4-phenylene) ether; said first component is 2-(2H-benzotriazol-2-yl)-p-cresol; and said second component is nickel bis (O-butyl (3,5-di-tert-butyl-4-hydroxybenzyl) ) phosphonate.

8. A composition according to claim 1 wherein said polyphenylene ether is poly-(2,6-dimethyl-1,4-phenylene) ether; said first component is 2-(2H-benzotriazol-2-yl)-4,6-di-tert-pentyl phenol and said second component is nickel bis-(O-butyl (3,5-di-tert-butyl-4-hydroxybenzyl) ) phosphonate.

* * * * *

UNITED STATES PATENT AND TRADEMARK OFFICE
CERTIFICATE OF CORRECTION

PATENT NO. : 3,925,509
DATED : December 9, 1975
INVENTOR(S) : Glenn D. Cooper and Visvaldis Abolins It is certified that error appears in the above-identified patent and that said Letters Patent are hereby corrected as shown below:

Column 6, line 47, "H-hydroxybenzyl)"

should be -- 4-hydroxybenzyl) --.

Signed and Sealed this thirtieth Day of March 1976

[SEAL]

Attest:

RUTH C. MASON
Attesting Officer

C. MARSHALL DANN
Commissioner of Patents and Trademarks